United States Patent Office 3,453,242
Patented July 1, 1969

3,453,242
ELASTOMERS FROM POLYETHERS AND ETHYLENE IMINE DERIVATIVES
Werner Schmitt and Robert Purrmann, Starnberg, and Peter Jochum, Hechendorf am Pilsensee, and Wolf Dieter Zahler, Haar, near Munich, Germany, assignors to Espe Fabrik Pharmazeutischer Praparate GmbH, Seefeld, Germany
No Drawing. Filed May 20, 1964, Ser. No. 368,999
Claims priority, application Germany, May 29, 1963, E 24,917
Int. Cl. C08g 33/06
U.S. Cl. 260—77.5       9 Claims

ABSTRACT OF THE DISCLOSURE

A process for making rubber-like elastomers on the basis of ethylene imine compounds, wherein the ethylene imine compound which is substantially linear, is basic in character and capable of alkylation, has a mean minimum molecular weight of 1000 and a minimum ethylene equivalent of 500, is subjected to a cross-linking reaction by means of such cross-linking agents as esters of strong acids, e.g. sulfonic acid esters, and similar agents. The rubber-like elastomers made by this process have a wide range of uses, as shaped pieces of all types, sealing means and coatings. When used for making replicas, their high dimensional accuracy and storing capacity without change is remarkable.

---

Rubber-like products are generally made by the polymerization of unsaturated hydrocarbons with one or several olefinic double bonds. Another type of polycondensation products having rubber-like properties are the thioplasts which are the known reaction products of aqueous solutions of alkali polysulfides with aliphatic dihalides.

Further known products are the silicone rubbers made in accordance with numerous condensation processes. By polyaddition, high molecular rubber-like compounds can be made from a wide variety of starting materials. Typical representatives of these are the polyurethanes, e.g. the conversion products of a polyester from adipic acid and ethylene glycol with a diisocyanate which is subsequently cross-linked.

The known synthetic rubbers, however, have the disadvantage that their processes of preparation are comparatively complicated or, as in the case of the silicone rubbers, are, on the one hand, expensive and have, on the other hand, unsatisfactory mechanical properties, at least when made without fillers. The thioplasts exhibit an unpleasant odor before cross-linking, the odor being partly present even after vulcanization. The polyurethane preliminary products are storable to a limited extent only, since they still contain isocyanate. In addition, they are not without danger from a physiological point of view. In processing them, they need very careful handling with exclusion of water. When using so-called "blocked" diisocyanates, these disadvantages are lessened, but rather high temperatures have to be used in the operation.

The particular properties and typical uses of these known rubber materials can be learned from Ullmann, "Encyclopaedie der Technischen Chemie," third edition, volume 9, pages 346 to 350.

Also known is the production of coatings and shaped bodies on the basis of polymerization products of ethylene imine or its derivatives (see for instance German Patents 836,353 and 919,265). Finally, German DAS 1,020,790 describes a process for making cross-linked polyester resins in which ethylene imine is added to certain unsaturated polyesters. Obtained are in that case substances with a comparatively low ethylene imine equivalent which can be converted into fairly hard products. By ethylene imine equivalent the amount of the substance in grams is to be understood containing 1 mol ethylene imine groups.

It is the object of the present invention to provide rubber-like elastomers based on ethylene imine compounds which are free of the above mentioned shortcomings. It is another object to provide processes for making the same. Other objects and advantages of the invention will become apparent from the following detailed description.

It has been found unexpectedly that polymer substances containing comparatively few ethylene imine groups, that is to say in which the reactive groups are present as it were in a rather diluted state, can be polymerized to yield transparent rubbery products having permanent elasticity and having properties which make them adjustable in a simple manner to a great variety of technical applications. It is surprising that the polymerization of ethylene imine derivatives, which will be more fully defined herein below, is at all possible because the reaction takes place in the manner of a cation mechanism which is subject to disturbing influences. Surprising is, further, the fact that the polymerization which leads to a cross-linking of the molecules and which can be controlled to a very great extent, may be completed, if desired, in very short time and at comparatively low temperatures. In the cross-linked ethylene imine derivatives described in publications, we find always hard or brittle substances, in which in general high mechanical strength, e.g. great hardness, is emphasized as particularly desirable.

The process according to the invention for making rubber-like elastomers based on ethylene imine compounds by cross-linking is characterized by the use of an ethylene imine compound which is essentially a linear compound of a mean minimum molecular weight of 1000 and a minimum ethylene imine equivalent of 500. Cross-linking can be effected, in accordance with the starting material selected, in practically any desired time and within a wide temperature range, e.g. between 0 and 100° C., by means of a conventional cross-linking agent for low molecular ethylene imine compounds.

Advantageously, the ethylene imine compounds have a maximum viscosity of about 30,000 poises/70° C. A preferred range of viscosity lies at about 1 to 30,000 poises/25° C., more particularly at about 10 to 10,000 poises/25° C. The indicated figures refer to the viscosity of actually used substances or solutions of substances including a plasticizer, if desired, but without filler.

A preferred range for the ethylene imine equivalent lies between 1,000 and 8,000. The ethylene imine compounds should have, on the average, more than one ethylene imine group, preferably up to five ethylene imine groups per molecule. Especially suitable are ethylene imine derivatives having a mean of 1.8 to 2.5 ethylene imine groups.

As starting material we found very suitable polymers, substantially linear in structure, which contain ethylene imine groups within the above definition in any desired position of the molecules. Especially at the ends of the chain, groups can be attached which are substituted by ethylene imine radicals. The macromolecular ethylene imine compounds have a mean minimum molecular value of about 1,000. There is no real upper limit for the molecular weight; however, very high molecular products may be hard to work with due to their high viscosity. A preferred molecular range is between 3,000 and 25,000. Particularly valuable elastomers are made from products with a molecular weight between 6,000 and 15,000. Masses having higher molecular weights, e.g. above 20,000, or masses which tend to crystallization at room temperature, can be processed at higher temperatures or in mixture with low molecular liquid products.

It may be generally stated that the substances made according to the invention have properties similar to hard rubber when the starting materials used are at the lower limit of the above mentioned molecular and equivalent weights. They possess frequently a somewhat lower tear resistance, at least when they are unfilled.

In a further advantageous embodiment of the process a polymer ethylene iminie compound is used as starting material in which at least some carboxyl groups in terminal position and/or in side chains are reacted with an ethylene imine derivative with formation of acid amide bonds whereby a bivalent organic radical is present between the ethylene imine group and the acid amide group.

These ethylene imine compounds contain, in terminal positions and/or in side chains, as a rule more than one radical of the general formula.

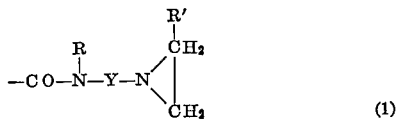
(1)

wherein R and R'=H or alkyl, and Y represents a bivalent organic group.

By carboxyl groups, derivatives of carboxyl groups should be likewise understood which are capable of forming acid amide groups. For instances, esters are comprised, preferably such which are easily converted into acid amides by aminolysis, e.g. the methyl ester, so-called "activated," e.g. aryl esters of the general formula

(2)

Particularly useful are the aryl esters with negative substituents on the benzene ring, such as nitro groups or halogen atoms. Examples are the 3,5-dichlorophenyl ester, 2,4-dichlorophenyl ester, 2,4-dibromophenyl ester, 4-nitrophenyl ester, 2,4,5-trichlorophenyl ester, and 2,4-dinitrophenyl ester.

The N-acyl compounds which are very active, are likewise used advantageously. By these we understand acid amide groupings which are easily split by aminolysis, for instance imidazolides of carboxylic acids of the general formula

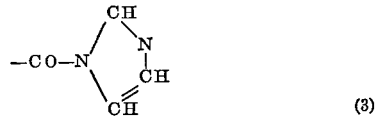
(3)

As a rule, it is not necessary to isolate the derivatives which can be aminolysed particularly easily and under mild conditions, viz. the activated ester or the N-acyl compound capable of aminolysis can be prepared and immediately thereafter reacted with an alkylene imino derivative whereby the ethylene imine groups are introduced into the macromolecules with formation of acid amide bonds.

Among the useful carboxyl derivatives are also carboxylic chlorides, especially carbonic ester chlorides (which are also known as chloro-formic acid esters or chlorocarbonic acid esters) obtainable, for instance, by reaction of phosgene with OH groups according to the equation, —OH+COCl$_2$→—OCOCl+HCl    (4)

As starting materials, the substantially linear, hence bifunctional polymers with terminal carboxyl- or OH-groups are well suited to which the residues with alkylene imino groups are added.

More particularly well adapted for the purpose are the substantially linear polyethers and polyesters which contain OH groups or carboxyl groups in end positions and/or in the side chains. Polymers in which these groups are exclusively or for the greatest part in terminal position, have the advantage that they lead to elastomers with more uniform chain lengths between the cross-linking points and have therefore superior mechanical properties.

The introduction of the ethylene imine groups into polyesters or polyethers having principally terminal OH groups is done in a known manner. It is, therefore, possible to obtain the starting material needed according to the invention by acylation of the polyesters or polyethers with olefin carboxylic acids to whose double bonds subsequently ethylene imine is added. In the first place, crotonic or acrylic acid may here be used. Acylation of the OH groups and subsequent ethylene imine addition can be illustrated schematically as follows:

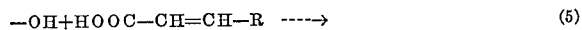 (5)

 (6)

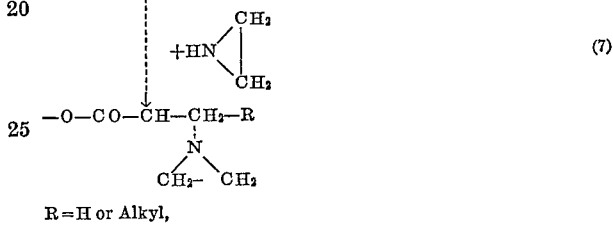
(7)

R = H or Alkyl,

A further modification of the process consists in the acylation of the above named polyesters or polyethers with halogen carboxylic acids and subsequent reaction with ethylene imine. We found the α-halogen carboxylic acids, such as chloro acetic acid or α-bromobutyric acid, particularly suitable. The manner of acylation can be carried out in different ways, e.g. by esterification in the presence of an acid catalyst, by means of acid anhydrides or acid chlorides.

A further mode of operation to obtain the starting materials according to the invention consists of the reaction of polyesters or polyethers with isocyanates which are, at least, bi-functional, preferably diisocyanates, e.g. 2,4-toluylene - diisocyanate, 4,4' - diphenylmethane-diisocyanate, naphthaline-1,5-diisocyanate, hexane-1,6-diisocyanate. In this reaction which is known per se, it is frequently advisable to work at low temperatures in order to avoid side reactions; this can be achieved by the use of highly active catalysts, such as tertiary amines, or metal compounds, e.g. zinc acetyl-acetonate or organotin compounds. In general, these catalysts do not disturb the subsequent processing of the substances. Also useful are the so-called "isocyanate-lengthened" polyesters having urethane groups in the chain.

In the following reaction, the polyesters or polyethers having terminal isocyanate groups are reacted with ethylene imine, or preferably with ethylene imine derivatives, containing a reactive hydrogen. For this purpose, there are, e.g. ethylene imine derivatives with OH groups or primary or secondary amino groups available. We mention for instance γ-ethylenimino-propylamine and β-ethylene imine ethyl amine. Furthermore, ethylene imine alcohols, such as 3-ethylene imino-propanol-1, as well as ethylene imino-acyl derivatives of, at least, bivalent amines; the last mentioned class of substances has, among others, the particular property that the preliminary and final products contain comparatively weakly basic amino groups which may be advantageous. Of particularly low basic character and therefore valuable for certain special purposes are α-ethylene imino-acyl derivatives. Polyesters with terminal carboxyl groups may likewise be reacted in a known manner with diisocyanates and thereafter, as mentioned above, with ethylene imine derivatives.

The conversion of OH groups with diisocyanates and the subsequent reaction with ethylene imine derivatives containing OH= or amino groups are illustrated by the following reaction scheme:

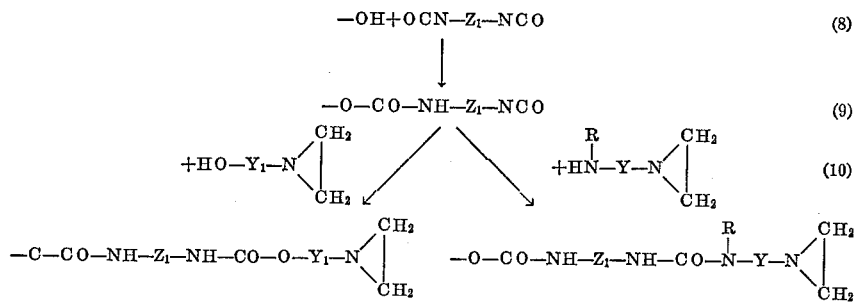

$Z_1$, Y and $Y_1$ are bivalent organic radicals
$Z_1$ is preferably an alkylene group or a bivalent aromatic radical.
Y and $Y_1$ are preferably alkylene groups which may be interrupted by ether- or acidamide groups and
R=H or alkyl.

Other excellently suited starting materials are polyesters containing groups or substituents in the chain or attached thereto which were made to react with ethylene imine, partic1ularly conjugated double bonds or halogens.

Polyesters proved to be particularly useful, which contain partly unsaturated α,β-unsaturated dicarboxylic acids or halogen dicarboxylic acids. Especially useful are mixed condensates which contain, in addition to saturated dicarboxylic acids, a certain amount of maleic acid, itaconic acid and the like, to which ethylene imine may be added in a known manner. In that case, too, the minimum ethylene imine equivalent weight should amount to an average of 500. Polyesters are e.g. useful having a mean molecular weight of 3,000 to 7,000 containing 3 to 6 ethylene imine groups. As mentioned above, of course, the polyesters may have additional substituents with ethylene imine groups in end positions.

In the polyethers, sometimes called polyglycolethers, we may mention e.g. polymers and copolymers of cyclic ethers, especially with 3 to 5 ring members, such as ethylene oxide, propylene oxide, tetrahydrofurane, oxetane (trimethylene oxide), and substitution products. Branched products are also useful e.g. polyoxy alkylation products of tri- or polyvalent alcohols.

The polyglycol ethers best suited have the following formula:

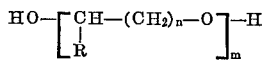

In this formula
n=1, 2, or 3
m=the mean polymerization degree, preferably about 25 to 500.
R=H or alkyl In copolymers, R may have different meanings in the same molecule.

If the products do not already contain carboxylic groups as substituents, these may be introduced by known means for instance by reaction of terminal or lateral hydroxyl groups with isocyanate carboxylic esters (N-carbonyl-amino-acid esters). These may be e.g. isocyanato acetic acid ester, α-isocyanato propionic ester, 6-isocyanato caproic ester, 11-isocyanato undecanoic ester. Furthermore, polymers with terminal or lateral OH groups, particularly polyethers, may be provided with carboxyl groups by reaction with dicarboxylic acid or their derivatives. Suitable are e.g. succinic acid or phthalic acid, particularly their anhydrides.

As another possibility we mention the conversion of terminal or lateral hydroxyl groups (the latter of which are, for instance, obtainable by incorporation of glycide acetate into a polyether, and by subsequent saponification) with phosgene into chloro-formic acid esters and to react them thereafter with amino acid esters. If, in this reaction, esters of secondary amino acids are used, urethane esters are obtained which contain an N-alkyl group in the urethane radical instead of an NH group. The chloro-formic acid ester may also be reacted with alkylene imino amines directly.

So-called isocyanate-lengthened polyethers are useful, i.e. comparatively low molecular polyether glycols, whose molecular weight is increased by reaction with polyvalent isocyanates. As a rule, diisocyanates are preferably used for the purpose, since the products should substantially be of linear structure, that means that they should have only few branching points.

Moreover, it is possible to incorporate cyclic ethers preferably epoxides, with carboxylic groups into polyethers by copolymerization. Suitable are for instance epoxidized olefinic carboxylic esters, e.g. 4,5-epoxi-valeric ester, or 10, 11-epoxi-undecanoic ester. Esters of glycidic acid are less suitable, since they often yield instable polymers.

In another embodiment of the invention, starting materials are polyethers into which a certain amount of halogen substituted epoxides, e.g. epibromohydrin, were incorporated by polymerization. These substances contain units with short halogen substituted side chains.

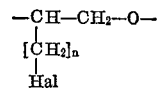

(n being preferably 1–4) e.g. when used epibromohydrin $CH_2Br$-side chains. We may use especially polymers or copolymers of ethylene oxide, propylene oxide or tetrahydrofuran of the mean molecular weight 2000 to 20,000 with at least 2, preferably 3 to 10, halogen substituted side chains.

Instead of halogen substituted epoxides, it is possible to incorporate by polymerization such epoxides which contain α,β-olefin carboxylic acid residues. Particularly useful is glycide acrylate or glycide crotonate. By copolymerization with cyclic ethers, polyethers are obtained having activated double bonds in the side chains. Furthermore, copolymers of cyclic ethers with other esters of epoxy alcohols e.g. glycide acetate, can be used as starting material. From these, polyglycol ethers may be obtained by saponification having OH groups in the side chains.

All the mentioned types of polyglycol ethers with substituted side chains may be provided in subsequent reactions, in a manner known per se, with ethylene imine groups by reacting them directly with ethylene imine, or by first introducing some substituents which are, in turn, capable of reacting with suitable ethylene imine derivatives. Thus, in the above mentioned halogen-containing polyethers the halogen atoms can be exchanged with ethylene imine directly, or they are preferably first converted into amino groups by means of excess ammonia or phthalimide potassium, said amino groups being thereafter reacted with ethylene imine carboxylic acid esters. Since the halogen-containing polyethers act as alkylating agents and might therefore initiate undesired cross-linking reactions, care should be taken that the halogen atoms are substituted as far as possible, e.g., by amino groups, or that residual halogen should be eliminated by treatment with alkali metal alcoholate or the like.

Similar considerations apply to polyethers whose terminal OH groups are substituted by halogen in a known manner. These halogen atoms, too, may be exchanged with amino groups which may then be reacted e.g. with ethylene imine carboxylic esters.

To polyethers having activated double bonds in the side chains, which may be obtained e.g. from glycide crotonate, ethylene imine may be directly added. Finally, polyethers with terminal OH groups and/or OH groups in the side chains may be provided with ethylene imine groups according to the above described methods, preferably by acylation with suitable carboxylic acids or reaction with at least bi-functional isocyanates, and subsequent reaction with ethylene imine or its derivatives.

Wherever the final products should have high stability to hydrolysis, polyethers are the preferable material.

Of the likewise known polyesters of different structure, the ones best suited for the present invention are those composed of dicarboxylic acids and diols. In the following examples are given of the acids and of the diols, namely, succinic acid, glutaric acid, adipic acid, pimelic acid, azelaic acid, sebacic acid, α,α'-dimethyladipic acid, phthalic acid, terephthalic acid, p-phenylenediacetic acid as well as ether and thioether groups—containing dicarboxylic acids, e.g. 2,5 - dioxa - hexane-dicarboxylic acid - 1,6; 2,2' - ethylene - dithio - diacetic acid, 2,2'- p-xylylene - dithio - diacetic acid, ethyleneglycol, propanediol - 1,2, propanediol - 1,3, butanediol - 1,3, hexanediol - 1,6; 2 - ethylhexanediol - 1,3; 2,2 - dimethyl- propanediol - 1,3; 2 - methyl - 2 - propyl - propanediol- 1,3, tirethyleneglycol, tripropyleneglycol, polyethyl- eneglycols, polypropyleneglycols and thiodiglycol. Benzene derivatives should preferably be used in compartively small amounts in mixture with aliphatic dicarboxylic acids or diols.

The simultaneous use of small amounts of tri- or tetra-functional alcohols, such as trimethylol propane or pentaaerythrit or carboxylic acids e.g. tricarballyl acid, is possible and in some cases even advantageous for the final products. It is sometimes advisable to use polyesters with carboxylic terminal groups. It is true that it is possible to provide polyesters having terminal OH groups in a special reaction with carboxyl groups in the manner described above for polyethers. As a rule, the groups for building up the polyesters will be so chosen that the latter will have comparatively low melting points in order to suppress tendencies for crystallization in the elastomers. This can be done in a known manner, e.g. by using groups with an odd number of chain members or by incorporation of ether groups. In a similar manner, the hydrophilic character of the end products can be influenced largely by the selection of the starting materials, for instance, from propylene oxide products being highly hydrophilic are derived, whereas by incorporation of dicarboxylic acids or diols obtained from di- or polysiloxanes into polyesters, elastomers are obtained which are definitely hydrophobic. Examples for di- and polysiloxanes are bis - 3,3' - carboxy - propyl - tetramethyl- disiloxane, bis - 4,4' - carboxy - butyl - tetramethyl- disiloxane, bis - 3,3' - carboxy - propyl - octamethyl- tetrasiloxane or bis - oxymethyl - tetramethyl-disiloxane.

Other polyethers to be used are furthermore polythioethers or such polyethers which contain thioether groups and which may e.g. be obtained by polycondensation of thiodiglycol. Linear polyacetales are likewise suitable. The last mentioned types of substances will also have to contain terminal or lateral OH or carboxylic groups, or will have to be provided therewith in a known manner.

For the reaction, in principle all alkylene imine derivatives may be used as participants which, in addition, contain at least one primary or secondary amino group in the molecule. Ethylene imine derivatives with primary amino groups have the advantage of smooth reaction. They are represented by the formula

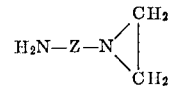

where Z stands for a bivalent organic radical. When using secondary amines, it is generally necessary to convert the carboxylic groups first into easily aminolysable groups, e.g. into cyanomethyl ester.

A preferred class of alkylene imine direviatives has the formula

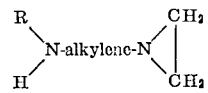

wherein R=H or alkyl. Particularly useful are e.g.

2-ethyleneimino-ethylamine,
3-ethyleneimino-propylamine,
3-ethyleneimino-butylamine,
5-ethyleneimino-pentylamine,
7-ethyleneimino heptylamine.

The alkylene chain may be interrupted by appropriate groups, e.g. ether or acid amide groups. The latter type of substances in which an alkylene imino carboxylic acid is linked to a diamine in the manner of an acid amide, may be obtained for instance by reaction of alkylene imino carboxylic esters with diamines. Among these compound are α-alkylene imino-carboxylic acid derivatives which have the advantage of particularly low basic character.

There are several methods for introducing the alkylene imino groups into the above mentioned polymers with formation of acid amide groups.

In principle, all methods known for the formation of amide and peptide bonds are useful in which the ethylene imine group which is known to be liable to reaction and is likely to be attacked by acids and alkylating means, is stable. We prefer to use processes which can be carried out under mild conditions of reaction and which have been developed in quite a number for peptide synthesis. By amide bonds we also mean the amides of carbonic acid halfesters (carbamates) which are formed from the above mentioned carbonic acid ester chlorides by reaction with amines according to the following equation.

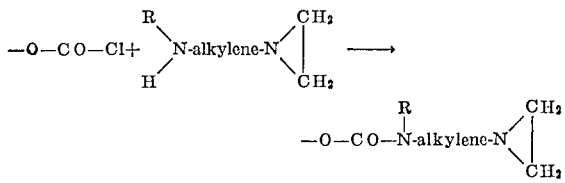

R=H or alkyl;
alkylene=alkylene group which may be interrupted by suitable groups, e.g. ether or acid amide groups.

We may use, for instance, the aminolysis of esters, especially methyl esters, preferably with addition of the conventional neutral or basic catalysts, such as diols, alcoholates, and the like. As mentioned before, a very advantageous modification of the process consists of using the aminolysis of activated esters, a large number of which has been described in the literature. The activated ester may, for instance, be obtained in a smooth reaction by conversion of carboxyl groups-containing polymers with diaryl carbonates, diaryl sulfites, or triaryl phosphites, e.g. bis-2,4-dinitrophenyl carbonate, bis-nitrophenyl sulfite or tris-2,4,5-trichlorophenyl phosphite; they may be subjected to aminolysis by amino akylene imines without isolation.

Further methods to be used are such in which acid amide bonds can be obtained from carboxylic acids and amines by interaction of certain reagents with formation of active carboxyl derivatives as intermediate products, as a rule so-called effective N-acyl bonds. Such reagents are e.g. N-carbonyl compounds of certain heterocycles, e.g. N,N'-carbonyl-diimidazol or carbodiimides, e.g. dicyclohexyl-carbodiimide, or N-cyclohexyl-N'-3-dimethyl aminopropyl carbodiimide.

Furthermore acid chlorides can be reacted with amines. Particularly suitable are the known carbonic acid ester chlorides (chloro-formic acid esters) of long chain diols etc.

In this method, chloro-formic acid esters can either be directly reacted with ethylene imine derivatives, or converted into mixed carbonates by reaction with phenols in the presence of acid-binding agents, said mixed carbonates being, in turn, reacted with ethylene imine derivatives.

In all the processes, care has to be taken that acids or acid groups, which also comprise phenols, present or formed during the reaction, should be neutralized or eliminated. This can be done in a known manner by alkaline agents, such as NaOH, KOH, $K_2CO_3$, or preferably tertiary amines, e.g. tri-ethylamine, which should be present in excess amount; or by ion exchangers having basic groups.

As a rule, particularly when working with highly viscous starting materials, the use of a solvent is advisable. Such solvents are primarily inert liquids. The reaction temperature should not be above 100° C. in order not to affect the ethylene imine groups. A preferred range of temperature is between 10° C. and 60° C.

It goes without saying that it is not necessary to provide every one of the carboxyl groups present in the polymer starting material with ethylene imine groups, under formation of acid amine groups. It may be sufficient—this is given as an example—to react a polyester with a means amount of 8 carboxylic ester groups with so much amine that, on the average, 3 to 4 of these ester groups are reacted with amine, which contains, in addition, an alkylene imine group.

As a general rule it should be noted that, in selecting the starting materials and the reaction conditions, care should be taken that groups capable of alkylation should not be present or formed during the reaction or only sparingly so, in a manner capable of control since they might be a disturbing agent during the subsequent cross-linking which is preferably initiated by alkylating agents. By groups capable of alkylation, we mean to designate primarily amino-, mercapto- and hydroxyl groups.

As cross-linking agents, the known alkylating agents and acids are useful, including Lewis acids, thus in principle all compounds which are capable of converting ethylene imine groups into ethylene immonium groups (see e.g. German Patents 888,170 and 914,325).

Particularly useful are esters of strong acids, e.g. sulfonic acid esters. The activity of such esters can be varied within wide limits by the choice of the alcohol component and, where derivatives of aromatic sulfonic acid esters are concerned, by variation of the substituents in the benzene nucleus. When using sulfonic acid methyl esters the cross-linking sets in, as a rule, at room temperature after several minutes and is practically finished after 20 to 50 minutes. On the other hand, isopropyl esters are extremely slow-acting cross-linking agents; the cross-linking takes, even with higher temperatures, generally hours or days.

Where it is desired to obtain especially high grade rubber qualities, it may be advisable first to mix the ethylene imine compound at room temperature with the cross-linking agents and then to heat, for some time, to slightly raised temperature, say, 50 to 100° C.

If an extremely rapid cross-linking at room temperature or lower temperature is desired, aromatic sulfonic acid methylesters with negative substituents in the benzene nucleus may be used e.g. halogen- or nitro-derivatives. Especially useful has been the 2,5-dichlorobenzene-sulfonic acid methyl ester.

Furthermore useful are dialkyl sulfates whose activity is strongly dependent on the alcohol component. Highly active is dimethyl sulfate. mixed dialkyl sulfates, too, are useful e.g. methyl-lauryl sulfate.

As acids to be used in cross-linking agents, we may mention e.g. sulfonic acids such as methane sulfonic acid and phosphoric acid; long-chain sulfonic acids, such as tetrapropylene benzene sulfonic acid, have the advantage of good solubility so that they can be well incorporated. Other organic acids may likewise be useful, particularly when mixed with alkylating agents. Moreover, we found Lewis acids, such a borofluoride, quite useful, particularly in form of complex compounds, e.g. with acid amides, such as N,N-dimethylacetamide.

Further examples of cross-linking agents are: Diethylsulfate, dipropylsulfate; also, asymmetric dialkylsulfates, e.g. methyl-butylsulfate, methanesulfonic acid-methylester, methanesulfonic acid-allylester, methanesulfonic acid-butylester, ethanesulfonic acid-methylester; benzene sulfonic acid-methylester, benzene sulfonic acid-ethylester, benzene sulfonic acid-allylester, benzene sulfonic acid-isopropylester, p-toluene-sulfonic acid-methylester, o-toluene sulfonic acid-methyl-ester, p-chlorobenzene sulfonic acid-ethylester, 2,5-dichlorobenzene sulfonic acid-ethylester, p-nitrobenzene sulfonic acid-methylester, p-nitrobenzene sulfonic acid-isopropylester, o-chloro-p-nitrobenzene sulfonic acid-butylester, p-methoxybenzene sulfonic acid-methylester, p-ethoxybenzene sulfonic acid-ethylester, naphthaline-1-sulfonic acid ethylester, benzene sulfonic acid, borofluoride - diethyletherate, borofluoride - dibutyletherate, borofluoride - tetrahydrofurane, borofluoride - butylacetate, tintetrachloride; oxoniumsalts, e.g. triethyl-oxoniumfluoborate, dimethyl - ethyl - oxonium - fluoborate, triethyl - oxonium - hexachloroantimoniate, sulfoniumsalts, e.g. triethysulfonium-fluoborate.

When cross-linking agents are solid at room temperature, they have to be used above their melting points or in the form of a solution, e.g. in a liquid cross-linking agent or in a preferably indifferent solvent, such as diethylene glycol-dimethyl ether, dioxane, benzene, and others.

As a general directive, we may mention that the hardening (or cross-linking) agents, as far as alkylating agents are concerned, act the more slowly or at the higher temperature, the larger and more branched the alkyl radical contained therein. Acids were particularly useful in mixture with alkylating agents.

It is a matter of course that the cross-linking rate is not only dependent on the activity of the cross-linking agent, but also on the concentration of the ethylene imine groups in the preliminary products, on the steric conditions at the ethylene imine groups, as well as at the neighboring substituents.

If it is desired to slow down the rate of cross-linking, and for obtaining a longer lasting pot-time, it may be necessary to use retarding agents. For this purpose, alkaline agents are suitable, especially those which are soluble in the ethylene imine derivatives. Suitable are e.g. alcoholates of higher alcohols, and particularly tertiary amines. Amines of low volatility are generally preferred.

Since, as mentioned above, cross-linking is initiated by acids or alkylating agents, basic agents, particularly amines, are useful as stabilizers against unintentional cross-linking. When making the preliminary products, care should also be taken when ethylene imine or its derivatives take part in the reaction that any acid groups which may be present, e.g. residual carboxylic groups in polyesters, be neutralized by basic agents.

The cross-linking and hardening agents are mostly liquids of low viscosity which are sometimes difficult to incorporate evenly into the more or less viscous masses. In order to overcome this difficulty, the hardening agents may be converted into a more viscous state corresponding to the field of application in any particular case; this may be done e.g. by addition of a plastic, such as polyvinyl acetate, or by incorporation of a filler with a large surface, for instance, highly dispersed silica.

Sometimes, the use of solutions of the cross-linking agents in suitable softeners is advisable. In this manner, it is not only possible to avoid undesirable mixing conditions, but it may be possible to provide easy incorporation of cross-linking agents which are solid at room temperature, such as p-chlorobenzene sulfonic acid methylester, into the ethylene imine compounds.

It may be useful when dealing with cross-linking agents of moderate activity, such as p-toluene sulfonic acid methylester, which has a slow reaction time at room temperature, first to mix it into the ethylene imine compound in the cold, and subsequently to heat the mixture to higher temperatures of about 50 to 100° C. This process is particularly useful when making large shaped pieces.

The cross-linking agent is usually added in an amount of 0.2 to 10% by weight, preferably 0.2 to 3%.

Except if it is desired to make use of a special property of the substances made in accordance with the invention, namely their transparency, in making glass-like shaped articles or coatings, the conventional fillers may be added which are used for improving mechanical properties, e.g. silica, silicates, e.g. calcium silicate, zinc oxide, calcium carbonate, barium sulfate, quartz powder, baryte, flour spar, calcium phosphate, or clay, as well as inorganic pigments or soluble dies and disinfectants.

Since hardening may also be accomplished by the addition of acids, fillers having acidic reaction are, in general, not suitable since they lead to an uncontrollable hardening. Plasticizers are frequently well compatible with ethylene imine derivatives. Their use is not only advisable for economical reasons, but for the improvement of other properties, especially avoidance or decrease of crystallization. Among the useful plasticizers are e.g. phthalates, glycol derivatives, and polymer plasticizers. Finally, the simultaneous use of other ethylene imine derivatives in small quantities is possible, including low molecular ones. In general, by the simultaneous use of such low molecular ethylene imine derivatives, products are frequently obtained which are similar to hard rubber, having low tear resistance. In some cases, the admixture of ethylene imine derivatives on the basis of polysiloxanes may be advisable.

Addition of monofunctional ethylene imine derivative leads, in general to less desirable mechanical properties, but a certain amount in monofunctionals is tolerable when the elastomers will not be exposed to higher mechanical stress. However, as a rule, the amount of bi-functional or higher functional ethylene imine derivatives should be at least 50%, preferably at least 80% by weight. In case a small amount of monofunctional material is present in the preliminary products—say because the starting material was not entirely bi-functional—the elimination of the monofunctional ingredients is not always necessary.

The simultaneous use of protective agents against aging may be necessary with elastomers on polyether basis; such protectives being especially antioxidants, e.g. diphenylamine compounds. If such antioxidants contain groups capable of alkylation, or acidic groups, the above mentioned statements should be observed. If such substances are, nevertheless, used, it is preferable to apply them only to the finished shaped bodies or to make them pass into the same by diffusion.

The rubber-like masses made according to the invention have a very wide range of technical application, e.g. for elastic shaped pieces of all types, as sealing means and coatings, e.g. in electro-technical application, for building purposes, in the production of automobiles, and for filling cracks and joints. They are useful for making replicas, especially in dental medicine. As compared to the conventional masses, such as elastic rubber masses as a silicone or thiocol basis, they have the marked advantage of higher storability and absence of odor. As compared to silicone molding masses, they have the added advantage that cross-linking will not become effective immediately after the addition of the cross-linking agent by increase of viscosity.

As compared with the widely used alginate molding materials, the elastomers on the ethylene imine basis have the advantage that replicas made therewith can be stored readily in air and can be cast repeatedly, whereas alginate replicas rapidly shrink in air and become useless thereby. Replicas made with the masses according to the invention are therefore distinguished by their dimensional accuracy.

The masses may further by advantageously used for making soft linings of protheses, particularly dental protheses. Here, the rapid cross-linking at room temperature is very useful. Due to this fact, a mixture of an ethylene imine compound with a highly active catalyst can be applied to the prothesis and may be allowed to harden in situ within a few minutes. Thus, an excellent accuracy of shape and thereby a first-rate fit of the prothesis is obtained. It will be understood that for a permanent lining of dental protheses only ethylene imine derivatives will be useful which, as mentioned before, do not have any readily hydrolysable bonds.

A further advantage of the products according to the invention is their good adherence and glueing property, particularly on glass, and the possibility to process them in combination with natural or synthetic organic or inorganic fabrics or fibers, e.g. even glass fibers. Stability to cold is generally very good.

With the ethylene imine compounds according to the invention, we are also able to prepare foamed materials by known means. Since during the cross-linking reaction, no $CO_2$ is developed, which is contrary to the known polyurethanes, it is necessary to use as blowing agents various organic solvents such as organic fluoro compounds ("freones") which evaporate during the foaming reaction.

A further field of application is afforded due to the unusual transparency of the elastomers made according to the invention, for optical purposes, e.g. for optical systems in general, for the production of lenses, or thin layers having satisfactory optical parameters, as well as intermediate layers for safety glass.

When polymers with carboxyl groups are used as starting materials, the present invention has the added advantage that these are generally easily accessible, and that the introduction of alkylene imine groups with formation of acid amide bonds is a reaction which usually proceeds very smoothly. This is an important factor since the introduction of ethylene imine groups by other routes yields frequently undesirable by-products which are difficult to remove, and which might disturb the cross-linking. It should also be noted that the acid amide bonds exhibit high stability to hydrolysis so that the elastomers made according to the invention, particularly those derived from polyethers, will likewise be distinguished by such stability. In this respect, they are favorably distinguished from elastomers on polyurethane basis which are known to contain biuret and allophanate groups whose stability to hydrolysis and to heat is not satisfactory.

It is surprising that the final products made according to the invention, particularly when they do not contain any aromatic radicals, are distinguished by high stability to light, a fact which was not to be expected in view of the amino groups contained therein.

The elastomers made according to the invention, particularly the last mentioned ones, may also be obtained in the shape of highly elastic threads. Especially useful for practical application are those substances which contain only ether groups and acid amide groups and therefore have no readily hydrolysable bonds.

A particular advantage of the elastomers on ethylene imine basis consists of their rapid transition, even at comparatively low temperatures, from the plastic state, in which they are easily sprayed through nozzles, into the gel state, in which they can be wound as threads.

As mentioned before, the rapid transition and the capacity for spinning connected therewith, may be adjusted by the selection of the catalyst. It is also possible to add first a moderately active catalyst to the ethylene imine compound and to spin the mixture through nozzles into a bath containing a highly active catalyst dissolved therein.

In making the ethylene imine compounds according to the invention, care should always be taken that the starting materials containing acids, acid groups, or acid splitting substances, are neutralized by at least the equivalent amount of basic agents. As already mentioned, very suitable therefor are especially amines, particularly tertiary amines. It should be particularly observed to remove Lewis acids, if these are present, especially compounds of boron and particularly $BF_3$, which is used for the polymerization of cyclic ethers, the removal to take place before ethylene imine or its derivatives are reacted. Such known operations which are conventional in the stabilization of ethylene imine derivatives, will not be particularly set forth in the examples.

If, in the examples following hereinafter, the ethylene imine derivatives should be purified in order to obtain especially bright and high-grade products, the known means can be used, such as filtration, if necessary in solution, over kieselgur, aluminum oxide, or treatment with ion exchangers, washing with solutions in organic solvents with water, aqueous alcohol, salt solutions, and the like, and, if necessary, repeated precipitation from e.g. benzene or alcohols with cyclohexane or gasoline. A purifying effect can also be achieved by fractionation in known manner; this will also lead to products with a more uniform molecular weight.

Example 1

250 g. of a polyester with terminal OH groups and a mean molecular weight of 7,200 made from adipic acid with addition of 10 mol percent sebacic acid and triethylene glycol, with addition of 10 mol percent of hexane diol-1,6 are heated under nitrogen with 21 g. crotonic anhydride for one hour to 150° C., and for two hours to 180° C. Subsequently, the crotonic acid formed and excessive crotonic anhydride are removed by a vigorous current of $N_2$ at 200° C.

50 g. of the so obtained product are admixed with 8 g. ethylene imine at 55° C. and allowed to stand at room temperature for 7 days. The mass is then taken up in benzene, washed several times with water and, after drying of the organic phase, solvent and excessive ethylene imine are removed by application of high vacuum at 50° C. Obtained are 38.5 g. of a light yellow oil having an amine equivalent of 3,900 and a viscosity of 2,900 poises/25° C.

1 g. of the ethylene imine compound is mixed with 0.06 g. benzene sulfonic acid methylester; after several minutes, viscosity increase sets in, and after about 20 minutes, a transparent body of rubber-elasticity has been formed whose elastic properties remain unchanged over a considerable period.

Example 2

0.5 g. of the ethylene imine compound made according to Example 1 is mixed with 0.03 g. of a mixture containing 4 parts p-toluene sulfonic acid methylester and 1 part p-chlorobenzene sulfonic acid methylester. Gelling sets in after about 1.5 minutes and after about 6 minutes, the rubber-elastic state is reached.

Example 3

1 g. of the ethylene imine compound made according to Example 1 is mixed with 0.06 g. of a 20% solution of 2.5 dichlorobenzene-sulfonic acid methylester in diamyl phthalate. After about 4 minutes, we obtain at room temperature a transparent mass of permanent rubber-elastic properties.

Example 4

100 g. of the polyester mentioned in Example 1 are heated with 7.0 g. acrylic anhydride and 1 g. copper powder in $CO_2$ atmosphere for one hour to 140° C. Subsequently, a strong current of $CO_2$ is blown through the reaction mixture at 160° C. for 3 hours. After cooling the mass is taken up in benzene, the undissolved portion is separated by centrifugation, and the benzene solution concentrated in vacuo.

50 g. of the so obtained substance are mixed with 3 ml. triethylamine and 2.5 g. ethylene imine. After standing for 6 days at room temperature, the substance is taken up in benzene, and solvent, triethylamine and excessive ethylene imine are sucked off in a high vacuum. Obtained are 49.5 g. of a slightly colored green-brown oil having a base equivalent of 3,200.

Dissolved copper can be removed by shaking the benzene solution with an aqueous solution of ethylene diamine-tetra acetic acid disodium salt.

1.0 g. of the so obtained ethylene imine compound is mixed with 50 mg. benzene sulfonic acid methyl ester. After about 3 minutes, the mass is noticeably more viscous and becomes, after about 12 minutes, rubber-elastic.

Example 5

2.0 of the ethylene imine compound as mentioned in Example 4 are mixed with 0.05 g. of a mixture consisting of equal parts of 2,5-dichloro-benzene sulfonic acid methyl ester and diethylene glycol dimethyl-ether. Cross-linking starts after about 1 minute, and is substantially complete after about 5 minutes.

Example 6

720 g. of a polyester prepared from adipic acid with addition of 15 mol percent pimelic acid and triethylene glycol which substantially contains terminal OH-groups and has a mean molecular weight of 1600, are heated with 230 g. crotonic anhydride for one hour to 150° C. and for one hour to 200° C. Subsequently, excess crotonic anhydride is blown off at 200° C. The so obtained polyester with crotonic acid terminal groups has a viscosity of about 80 poises at 25° C.

To 100 g. of the so obtained substance, 54 g. ethylene imine are added dropwise at 50° C.; after 5 days standing at room temperature, the mass is dissolved in benzene, repeatedly washed with water, whereupon the organic phase is brought to dryness in vacuo. 76 g. of an oil are obtained having an ethylene imine equivalent of 950.

1.0 g. of the ethylene imine compound is mixed with 0.08 g. p-toluene sulfonic acid methyl ester. After about 30 minutes a transparent rubber-elastic mass has formed.

Example 7

100 g. of a polyethylene glycol of a mean molecular weight of 4000 are heated with 12 g. of crotonic anhydride for 1 hour to 150° C. and for 1 hour to 180° C. Volatile ingredients are subsequently completely blown out at 200° C. by means of $CO_2$. A substance is obtained which is of wax-like consistency at room temperature.

50 g. of this product are melted at 50° C. and after addition of 10 ml. benzene are admixed with 10 g. ethylene imine and are heated to 35° C. for 4 days. Solvent and excessive ethylene imine are drawn off in vacuo. Obtained are 47.5 g. of a wax-like substance.

2.0 g. of this substance are mixed at 70° C. with 0.12 g. p-methoxybenzene sulfonic acid methyl ester. Cross-linking starts immediately and leads in several minutes to a product of hard rubber-like properties.

Example 8

113 g. of a polyester with terminal OH groups and a mean molecular weight of 2900, prepared from adipic and sebacic acids in a molar ratio of 1:1, and triethylene glycol with addition of 10 mol percent tetraethylene glycol, are reacted with 19 g. crotonic anhydride, as described in Example 1.

105 g. of the so obtained substance are allowed to stand with 31 g. ethylene imine and 25 g. triethylamine for 10 days. The mass is then dissolved in 100 ml. benzene, filtered, and dried in vacuo at 60° C. The product has a viscosity of about 100 poises/25° C. and an amine equivalent of 1670. After addition of 6 weight percent benzene sulfonic acid methyl ester, the substance acquires rubber elasticity in about 15 minutes.

Example 9

50 g. of a branched polyester prepared from adipic and sebacic acids, trimethylolethane and triethylene glycol, in a molar ratio 9:1:0.67:11, which has a viscosity of 140 poises/25° C., are heated with 15.6 g. crotonic anhydride for 1 hour to 150° C. and one hour to 200° C. Subsequently the volatile portions are blown out with $CO_2$ at 210° C.

50 g. of the so obtained substance are stirred with 25 g. triethylamine and 27 g. ethylene imine for 5 days. Subsequently, the mass is dissolved in benzene and brought to dryness at 60° C. towards the end in a high vacuum. Obtained are 51.5 g. of an ethylene imine compound having an equivalent weight of 1080.

1.0 g. of the ethylene imine compound is mixed with 0.06 g. benzene sulfonic acid methyl ester. A solid rubber is obtained after about 15 minutes.

If 1.0 g. of the ethylene imine compound is mixed with 0.12 g. of a 20% solution of 2,5-dichlorobenzene sulfonic acid methyl ester in diamylphthalate, the rubber-elastic state is reached after about 3 minutes. It remains unchanged after considerable storage time.

Example 10

(a) 0.5 g. of the ethylene imine compound described in Example 1 is mixed with 30 mg. benzene sulfonic acid ethyl ester and kept at 50° C. After about half an hour, cross linking has noticeably set in; it becomes complete after several hours.

(b) When the same ethylene imine compound is mixed with 6% methane sulfonic acid methyl ester, the rubber-elastic state is reached after about 40 minutes.

(c) 1.0 g. of the ethylene imine compound mentioned in Example 1 is mixed with 0.1 g. of a 20% solution of dimethyl sulfate in diamylphthalate. Gelling sets in after a very short time and is practically complete after about 3 minutes. A mass of good, permanent elasticity is obtained.

(d) When the same ethylene imine compound is mixed with 6% diethyl sulfate, gelling sets in after about 15 minutes and is complete after 1 to 2 hours.

(e) A mixture of 2.0 g. of the ethylene imine compound described in Example 1 with 0.12 g. phosphoric acid soon starts to gel and has reached a rubber-like state after about 4 hours.

Example 11

The polyester mentioned in Example 1 is reacted with crotonic anhydride as described therein. To 460 g. of the product a mixture of 80 ml. triethylamine and 90 ml. benzene is added while stirring at 55° C. Subsequently, 69 g. ethylene imine are added drop by drop. After standing for 6 days at room temperature, the volatile portions are removed at 50° C., towards the end in high vacuum. Obtained are 465 g. ethylene imine compound with an amine equivalent of 3650 and a viscosity of about 1200 poises/25° C.

For making a molding paste for replicas, 50 g. of the compound obtained are kneaded with 12.5 g. kieselgur and 1.2 g. zinc white.

A cross-linking paste is made by kneading 80 g. dioctyl phthalate, 20 g. 2,5-dichlorobenzene sulfonic acid methyl ester, 16 g. aerosil and 1 g. cadmopur red.

For making moldings, particularly in dental medicine, the two pastes are mixed in a ratio of about 5:1, until an even red color is reached. Setting starts at about 2½ minutes and is complete after about 4 more minutes at 36° C.

Example 12

82 g. of a polyester made from adipic acid, sebacic acid, trimethylol propane and triethylene glycol, in a molar ratio of 0:1:0.33:10.5, are heated with 13 g. crotonic anhydride for one hour to 150° C. and for four hours to 180° C. The mass is dissolved in benzene, shaken several times with sodium hydroxide, washed with water and dried in vacuo. Yield: 67 g.

35 g. of the so obtained substance are mixed with 10 g. triethylamine and are further mixed at 50° C. with 10.5 g. ethylene imine. After 6 days, the mass is dissolved in benzene and dried at 50° C. in vacuo.

1 g. of the so obtained ethylene imine compound which has an amine equivalent of 1535 is mixed with 0.06 g. benzene sulfonic acid methyl ester. After about 15 minutes, a rubber-elastic mass is obtained having an elasticity which does not change after the lapse of considerable periods.

Example 13

570 g. of a mixed polymer of tetrahydrofuran and ethylene oxide in a molar ratio of 1:1 which has a mean molecular weight of 3600, are heated in a $CO_2$ atmosphere with 46 g. crotonic anhydride for one hour to 150° C. and for one hour to 180° C. The volatile portions are removed subsequently by blowing at 200° C.

355 g. of the so obtained substance are mixed with 92 ml. triethylamine and 76 g. ethylene imine at 50° C. After allowing to stand for 7 days at room temperature the mass is taken up in chloroform, washed thoroughly, dried over potassium carbonate, filtered, and dried in vacuo. Yield: 281 g. ethylene imine compound having a base equivalent of 1920.

For making a molding paste, 100 g. of the ethylene imine compound, 5 g. dibutylphthalate, and 50 g. kieselgur are kneaded together. When this paste is mixed with the cross-linking paste described in Example 11 in a ratio 4:1, the rubber-elastic state is reached after a few minutes.

For mucostatic replica-making in dental medicine, where a slow setting is desired, the two pastes are mixed in a ratio 7:1.

Example 14

250 g. of a polyester with an OH-equivalent of 1380 prepared from adipic acid with an addition of 10 molar percent sebacic acid, and butane diol-1,3, with addition of 8 mol percent hexane diol-1,6, are heated in $CO_2$ atmosphere with 85 g. crotonic anhydride for 2 hours to 180° C. and for 4 hours to 200° C. After blowing off the volatile portions, 60 g. triethylamine and 65 g. ethylene imine are admixed at 45° C. and are allowed to stand for 7 days at room temperature. The mass is taken up in chloroform, thoroughly washed with water, desiccated, filtered and brought to dryness. Yield: 205 g. ethylene imine compound having a base equivalent of 1520.

1.0 g. of the ethylene imine compound is mixed with 0.08 g. benzene sulfonic acid methyl ester and, after 30 minutes, a rubber-elastic mass has been formed.

Example 15

N-(N'-isopropyl - aminopropyl) - ethyleneimino - acetamide is made by allowing to stand for 3 days at room temperature a mixture of 0.45 mol ethyleneimino-acetic ester and 1.36 mol γ-isopropylamino propylamine. By rectifying in vacuo one obtained 58 g. N-(N'-isopropylaminopropyl)-ethyleneimino-acetamide having a boiling point of 110 to 113° C. at 0.1 mm. pressure.

In 34.2 g. of a copolymer from ethylene oxide and tetrahydrofuran in molar ratio 1:1 having a mean molecular weight of 5700, 0.034 g. zinc-propionyl-acetophenonate are dissolved. Then one adds 2.61 g. toluylene-2,4- diisocyanate at 18° C. After 15 minutes, 3.58 g. N-(N'-isopropyl - aminopropyl)-ethyleneimino - acetamide are added drop by drop at 20° C. and are further stirred for 15 minutes.

When 2.0 g. of the so obtained ethylene imine compound are mixed with 0.12 g. benzene sulfonic acid methyl ester, gelling sets in after a few minutes, and after about 20 minutes a product clear as glass and of high permanent elasticity has formed.

Example 16

In 14 g. of the polyester mentioned in Example 1, 0.014 mg. zinc-propionyl-acetophenonate are dissolved at 40° C. Subsequently, 0.87 g. toluylene-2,4-diisocyanate are added at 20° C., stirring is effected at room temperature for one hour, and thereafter 1.19 g. N-(N'-isopropyl-aminopropyl)-ethyleneimino-acetamide is added. The reaction is terminated after a few minutes.

A mixture of 1.0 g. of the so obtained ethylene imine compound and 0.07 g. benzene sulfonic acid methyl ester quickly gels and the rubber-elastic state is reached after about 20 minutes.

Example 17

To a solution of 0.020 g. zinc propionyl acetophenonate in 20.0 g. of a copolymer of ethylene oxide and tetrahydrofuran in molar ratio 1:1, having a mean molecular weight of 5,700, one adds at room temperature 1.52 g. toluene-2,4-diisocyanate, and after 15 minutes 1.04 g. γ-ethylene imino propylamine. Subsequently, stirring is continued for another 15 minutes at room temperature. After addition of 6 percent benzene sulfonic acid methyl ester the so obtained ethylene imine compound becomes rubber-elastic after about 15 minutes.

Example 18

The OH terminal groups of a polyester made from adipic acid, sebacic acid, hexane diol-1,6 and triethylene glycol in molar ratio 18:2:15:6, are treated with crotonic anhydride as described in Example 1.

200 g. of this product are mixed at 50° C. with 42 ml. triethylamine and 35 g. ethylene imine and allowed to stand for 6 days at room temperature. Then the mass is taken up in chloroform, thoroughly washed, dried over potassium carbonate; after filtration and removal of the solvent in vacuo, 185 g. of a wax-like substance are obtained having a base equivalnt of 2600.

When 5 g. of the substance melted at 40° C. are mixed with 0.06 g. of a 20 percent solution of 2,5-dichloro-benzene sulfonic acid methyl ester in dioctyl phthalate, a solid rubber has formed after a few minutes having good tear resistance and permanent elasticity.

Example 19

By mixing 2 parts of the ethylene imine compound described in Example 18, with 1 part dioctylphthalate, a slightly turbid mass is obtained. When mixing 7.5 g. of this mass with 0.6 g. of a 20% solution of 2,5-dichloro-benzene sulfonic acid-methyl ester in diamyl phthalate, cross-linking is noticeable after a few minutes by viscosity increase. After about 15 minutes, a highly elastic rubber has formed.

Example 20

A copolymer of tetrahydrofuran and ethylene oxide in the molar ratio of 2:1 having a means molecular weight of 6600, is converted in the usual manner with crotonic anhydride. To 52 g. of the substance so obtained, a mixture of 3 g. triethylamine and 3.35 g. ethylene imine is added at 50° C. and stirred. After 11 days of standing at room temperature, a large amount of the amines is removed in vacuo at 50° C.; the remaining mass is dissolved in chloroform and after washing, drying, and elimination of the solvent with application of high vacuum in the last stage, 45.5 g. of ethylene imine compond are obtained having a base equivalent of 3270.

1.0 g. of this substance is mixed with 0.1 g. of equal parts of 2,5-dichloro-benzene sulfonic acid methyl ester and diethylene glycol-dimethylether. After about 20 minutes, a rubber-elastic substance has formed.

Example 21

To a mixture consisting of 28.5 g. of a copolymer of tetrahydrofuran and ethylene oxide in the molar ratio 3:1 with a mean molar weight of 5700, 2 ml. ethylene glycol dimethyl ether and 1.96 g. toluylene-2,4-diisocyanate, we add 0.03 g. dibutyltin dilaurate at 0° C. After allowing to stand at 0° C. for one hour, 2.69 g. N-(N'-isopropyl - aminopropyl) - ethyleneimino-acetamide are slowly added drop by drop. Subsequently, the mixture is allowed to warm up to room temperature, is dissolved in 100 ml. chloroform, repeatedly washed with water, dried by potassium carbonate and brought to dryness in vacuo. Yield: 20.05 g. ethylene imine compound with a base equivalent of 2970.

For making a lense, 1.5 g. of the substance are mixed with 0.095 g. benzene sulfonic acid methyl ester and brought into a suitable mold. After 30 minutes, the article is removed from the mold and a lense is obtained having high scratch resistance whose focal length can be reversibly changed by deformation.

Example 22

A polyester made from adipic acid, maleic anhydride, hexanediol-1,6, butanediol-1,3 and decanediol-1,10 in molar ratio 17:3:16:3:2, is provided in the manner described above with crotonic acid terminal groups.

To 154 g. of this substance, one adds, while stirring, a mixture of 30 g. triethylamine and 43 g. ethylene imine at 45° C. and allows to stand at room temperature for 5 days. Subsequently, the mass is taken up in chloroform and processed as usual. Obtained are 134 g. of an ethylene imine compound having a base equivalent of 1660.

The substance which is wax-like at room temperature is melted at 35° C. and 1.0 g. thereof is mixed with 0.14 g. of a mixture of equal parts of p-toluene-sulfonic acid methyl ester and dioctylphthalate. After several minutes, a stiff rubber-elastic substance has formed.

Example 23

60.0 g. of a copolymer of tetrahydrofuran and ethylene oxide, in molar ratio 1:1, with a mean molar weight of 2000, are mixed with a solution of 4.2 g. naphthalene-1,5-diisocyanate in 60 ml. ethylene glycol-dimethyl ether at 30° C.; subsequently, 0.25 ml. dibutyl tin dilaurate is added and allowed to stand for 20 hours at 25° C. Subsequently, 3.94 g. toluylene-2,4-diisocyanate are added drop by drop while stirring at 0° C., and stirring is continued at that temperature for 4 hours. After having added 5.2 g. N-(N'-isopropyl-aminopropyl)-ethyleneimino-acetamide the mass is allowed to come to room temperature, taken up in chloroform, and yields after the conventional purification 60.5 g. ethylene imine compound having an equivalent weight of 3830. A mixture of 1.0 g. of this substance and 0.05 g. of a solution of 1 part, 2,5-dichloro-benzene sulfonic acid methyl ester in 2 parts diamyl-phthalate begins rapidly to gel and is transformed after a few minutes into a solid rubber of permanent elasticity.

Example 24

A copolymer of tetrahydrofuran and ethylene oxide in molar ratio 2:1 with an OH equivalent 1760, is provided with acrylic terminal groups in the manner described in Example 4. To 50 g. of this substance, a mixture of 3.0 g. triethylamine and 3.45 g. ethylene imine are added at 50° C. while stirring. After 10 days standing at room temperature, processing is effected in the usual manner. Dissolved copper is removed by shaking with an aqueous solution of the disodium salt of ethylene diamine-tetra acetic acid. Yield: 36.7 g. ethylene imine compound having a base equivalent of 1945.

2.0 g. of this substance yield, after mixing with 0.24 g. of a mixture of 40 parts p-chloro-benzene sulfonic acid methyl ester and 60 parts diamylphthalate, a stiff rubber after about 10 minutes.

Example 25

1.0 g. of the ethylene imine compound described in Example 1 is mixed with 0.10 g. of the boron-trifluoride-N,N-dimethyl acetamide complex compound. Cross linking occurs very soon. For about 5 minutes the mass is heated to 50° C. and passes into the rubber-elastic state.

Example 26

0.5 g. dibutyl tin dilaurate is dissolved in 121.5 g. polypropylene glycol of the mean molar weight 2000 and 10.8 g. diphenylmethane-4,4'-diisocyanate are added drop by drop while stirring at 0° C. Subsequently, the mixture is allowed to take up room temperature and to stand at the temperature for 20 hours.

To 60 g. of this mixture, a solution of 3.68 g. toluylene-2,4-diisocyanate and 0.08 g. dibutyl tin dilaurate in 17 ml. ethyleneglycol-dimethyl ether is added drop by drop while stirring at 0° C. and stirring continued for 4 hours at the same temperature. After having added 4.8 g. N-(N'-isopropyl-aminopropyl)-ethyleneimino-acetamide at 0° C., the mass is allowed to take on room temperature, is then taken up in methylene chloride; one washes thoroughly with water, dries over potassium carbonate, and drives off the solvent, in the last stage in high vacuum. Yield: 41.5 g. ethylene imine compound having a base equivalent of 3850.

0.8 g. of this ethylene imine compound are stirred together with 0.015 g. of a mixture of 10 parts 2,5-dichloro-benzene sulfonic acid methyl ester and 3 parts diethyleneglycol-dimethylether. After a few minutes, the mixture has rubber-like consistency.

Example 27

N-(N'-isopropyl-aminopropyl)-α-ethylene imine-butyramide is prepared by heating a mixture of 0.2 mol α-ethylene imine-butyric methylester, 0.6 mol γ-isopropyl-aminopropylamine and 15 ml. methanol under reflux for 2 days at 70° C. By rectifying in vacuo, 17 g. N-(N'-isopropyl-amino-propyl)-α-ethylene imine-butyramide are obtained having a boiling point of 115 to 118° C. at 0.1 mm.

45.0 g. of a copolymer of tetrahydrofuran and ethylene oxide in a molar ratio 3:1 and a mean molecular weight of 4,500 are mixed with 13 ml. anhydrous ether. Subsequently, 3.93 g. toluylene-2,4-diisocyanate and 0.11 g. dibutyl tin dilaurate are added at 0° C. and allowed to stand for 4 hours at the same temperature. After having stirred 12 ml. ether into the reaction mixture, the latter is divided.

Into 34.0 g., 3.12 g. of N-(N'-isopropyl-aminopropyl)-α-ethylene imine-butyramide are mixed while stirring at −2° C. The mixture is allowed to reach room temperature, taken up in 250 ml. ether and yields after repeated washing, drying over potassium carbonate, and removal of the solvent, 15.6 g. ethylene imine compound having a base equivalent of 2620.

2.0 g. of this substance are mixed with 0.04 g. of a mixture of p-chloro-benzene sulfonic acid methyl ester and benzene sulfonic acid methyl ester in the ratio of 1:1. Cross-linking sets in after about 3 minute: after about 10 minutes, a rubber-elastic body is formed.

Example 28

26.4 g. of the reaction mixture mentioned in Example 27, second paragraph, are mixed with 0.85 g. β-ethylene imino ethanol at 0° C. and allowed to stand at room temperature for 24 hours. Then, 200 ml. ether are added, the solution is repeatedly washed with water and the solvent is removed in the last stage by high vacuum. Yield: 15.8 g. ethylene imine compound with amine equivalent 3130.

3 g. of this substance are mixed with 0.06 g. of a mixture containing equal parts p-chloro-benzene sulfonic acid methyl ester and benzene sulfonic acid methyl ester. After about 15 minutes, a viscous rubber-like mass has formed having high permanent elasticity.

Example 29

A co-polymer of tetrahydrofuran, ethylene oxide, and 4-bromobutene oxide-1,2 in the molar ratio of 100:30:4 is prepared according to the process of W. J. Murbach and A. Adicoff, Ind. Eng. Chem. 52, 772 (1960). The product has a bromine equivalent of 1910. For exchanging the bromine atoms by amino groups, 64.4 g. of the copolymer dissolved in 98 g. dimethylformamide, are heated with 8.4 g. phthalimide potassium for 34 hours to 80° C. The mixture is then stirred into 500 ml. water and the precipitated substance is reprecipitated twice from methyl glycol with water. The precipitate is again dissolved in a large quantity of methylglycol and the adhering water is removed by distilling off the methylglycol in vacuo.

The so obtained solution in methylglycol (650 ml.) is heated with 2.73 ml. of an 80% aqueous solution of hydrazine hydrate for 2½ hours at 80° C. After distilling off 200 ml. methylglycol in vacuo, 270 ml. 2 N acetic acid are added and the mixture is refluxed for an hour. After sucking off phthalic hydrazide which has formed, 630 ml. methanol and 400 ml. water are added to the filtrate which is allowed to pass through a column charged with a strongly basic ion exchanger (OH form); thereafter the solution is concentrated in vacuo and shaken with methylene chloride after addition of 30 ml. of 30% sodium hydroxide. After removal of the solvent, 35 g. polyamine are obtained with an amine equivalent of 2220.

8.88 g. of this substance are heated with 4.6 g. ethylene imino acetic acid methylester, 5.0 g. glycol and 10 ml. methanol for 34 hours to 50° C. The reaction mixture is taken up in 130 ml. methanol and precipitated with 500 ml. water. The precipitate is thoroughly stirred with 100 ml. water and after centrifuging taken up in ether. After drying and evaporation of the solvent, 6.8 g. polyethylene imine compound are obtained.

2.0 g. of this substance are mixed with 0.13 g. of a mixture consisting of 10 parts 2,5-dichloro-benzene sulfonic acid methyl ester and 3 parts diethyleneglycol-dimethylether. After a short while, cross-linking sets in and leads, after about 20 minutes, to a rubber-elastic product.

Example 30

150 g. of a polyether (prepared from tetrahydrofuran, ethylene oxide, ω-epoxy-undecanoic methyl ester and BF₃ as initiator, in molar ratio 120:32:8:1) having a mean molecular weight of 8,700 and an ester equivalent of 1,050 are allowed to stand for 4 days at room temperature with 50 g. methanol, 90 g. γ-ethylene imino propylamine and 10 ml. potassium glycolate solution (prepared by dissolving 1 g. potassium in 100 ml. ethylene glycol). Then we add 300 ml. methanol and purify by stirring with an acid ion exchanger, precipitating with water and reprecipitating from ethylene glycol-dimethylether with water. The so obtained oil is taken up in benzene, dried over potassium carbonate and the solvent is removed finally by a high vacuum. Yield: 82.5 g. ethylene imine compound in form of a colorless oil having a base equivalent of 1910.

2.5 g. of this compound are mixed with 0.3 g. of a 20% solution of 2,4-dichloro-benzene sulfonic acid methyl ester in dioctylphthalate. After about 20 minutes, a transparent rubber-like mass has formed having a high permanent elasticity.

Example 31

When the mixture of polyether, γ-ethylene imino propylamine etc. described in Example 30, is allowed to stand for 8 days at room temperature, we obtain after appropriate processing an ethylene imine compound having a base equivalent of 1200.

A mixture of 2 g. of this substance with 0.25 g. of a 20% solution of 2,4-dichloro-benzene sulfonic acid methyl ester in dioctylphthalate rapidly starts to gel and has been transformed after about 10 minutes into a solid rubber.

Example 32

300 g. of a polyether (prepared from tetrahydrofuran, ethylene oxide, ω-epoxy-undecanoic methylester and $BF_3$ as initiator, in molar ratio 100:50:8:1), having a mean molecular weight of 9,400 and an ester equivalent of 980, are heated with 400 g. methanol, 180 g. γ-ethylene imino propylamine and 40 g. glycol for 10 days to 50° C. Subsequently, as the mass is taken up in 600 ml. methanol and worked up as described in Example 30. Yield: 241 g. of a viscous oil having a base equivalent of 1080.

4 g. of the so obtained ethylene imine compound are mixed with 0.5 g. of a 20% solution of 2,4-dichlorobenzene sulfonic acid methyl ester in dioctylphthalate. After half an hour, a rubber-elastic mass has been formed.

Example 33

60 g. of a polyether made from tetrahydrofuran and ethylene oxide in a molar ratio 2:1 having a mean molecular weight of 9750, and having been provided with methyl ester terminal groups, by reaction of the terminal OH groups with isocyanate aceticmethylester in a manner known per se, are dissolved in 30 ml. methanol and heated with 3.6 g. ethylene imino propylamine for 42 hours to 50° C. Subsequently, the mixture is taken up in 200 ml. methanol precipitated with a large amount of water and the separated oil is dissolved in benzene, whereafter the solvent is evaporated after drying in vacuo. The residue weighs 52.5 g. and has a base equivalent of 5150.

When 2 g. of the ethylene imine compound are heated with 0.3 g. of a 20% solution of 2,4-dichlorobenzene sulfonic acid methyl ester in diamylphthalate to 50° C., a rubber elastic body is formed after about 10 minutes.

Example 34

20 g. of the polyether described in Example 33 are allowed to stand for four days at room temperature with 10 ml. methanol and 1.9 g. ω-ethylene imino heptylamine (made from ω-bromoenanthic nitrile by reaction with ethylene imine and subsequent hydrogenation with lithiumalanate). After addition of 10 ml. methanol, a large amount of water is used for precipitating and the oil thus obtained is taken up in ether. After drying over potassium carbonate, precipitation is effected with low-boiling gasoline and the isolated oil freed from solvent in vacuo. Obtained are 17.7 g. ethylene imine compound with a base equivalent of 5850.

A mixture of this substance with 2 weight percent of benzene sulfonic acid methyl ester assumes a rubber-like consistency after about 20 minutes standing at 80° C.

Example 35

3 g. of the ethylene imine compound described in Example 34 are mixed with 0.06 g. m-chlorobenzene sulfonic methyl ester. The mixture is converted into solid rubber after about 30 minutes at 50° C.

Example 36

67.3 g. of a polyester prepared from adipic acid, azelaic acid and 1,6-hexane diol in molar ratio 7:7:13, which has a substantial number of carboxyl terminal groups and a mean molecular weight of 3370, are dissolped in 34 ml. pyridine with 21.9 g. di-p-nitro-phenylcarbonate and heated for 2½ hours to 60° C. The yellow syrup which forms is stirred into a mixture of 200 ml. ethyleneglycol dimethylether, 200 ml. methanol and 200 ml. of a strongly basic ion exchanger. Subsequently, 10.0 g. γ-ethylene imino-propylamine are added drop by drop and stirring is continued for 30 minutes. After filtration, pyridine and by-products are removed by passing the solution through columns of acid and basic ion exchangers, respectively, and drying is performed in vacuo.

2.0 g. of the so obtained ethylene imine compound are mixed with 0.04 g. benzene sulfonic acid methyl ester at 50° C. When the mixture is further heated to 50° C., gelling sets in after about 3 minutes and gradually yields a rubber-elastic product. When the mixture is heated to 80° C. instead, a dry rubber-elastic body is obtained after about 3 minutes.

Example 37

82.4 g. of a polyester prepared from equimolar amounts of pimelic and glutaric acids, and 1,3-propanediol and 1,6-hexane diol, respectively, said ester having primarily terminal carboxylic groups and a mean molecular weight of 4120, are heated with 40 ml. pyridine and 21.9 g. di-p-nitrophenylcarbonate for 3 hours to 65° C. The light-brown syrup formed is reacted and worked up as described in Example 36 with 10.0 g. γ-ethylene imino propylamine. Obtained are 67.4 g. ethylene imine compound in the form of a slightly brown colored oil.

3.0 g. of this substance are mixed with 0.06 g. m-chlorobenzene sulfonic acid methyl ester; cross-linking is substantially completed after 5 minutes at 80° C. with formation of a rubber-elastic body.

Example 38

13.4 g. of the polyester according to Example 36 dissolved in 20 ml. ethyleneglycol dimethylether is mixed with a solution of 0.8 g. N,N'-carbonyl-diimidazol in 30 ml. ethyleneglycol dimethylether, and the mixture is allowed to stand at room temperature for 2½ hours. Subsequently, a solution of 1.52 g. γ-ethylene imino propylamine in 5 ml. ethylene glycol dimethylether is added. After 10 minutes, the solvent is removed to vacuo and the residue taken up to 150 ml. benzene. The imidazol formed is eliminated by repeated shaking with water. Finally, the benzene solution is dried over potassium carbonate and freed from the solvent in vacuo. The ethylene imine compound formed is almost colorless and wax-like at room temperature.

4 g. of this substance are melted at 50° C.; into this, 0.12 g. m-chloro-benzene sulfonic acid methyl ester is mixed whereupon gelling sets in after about 5 minutes. After about one hour, a rubber-elastic mass has formed.

Example 39

67.3 g. of the polyester mentioned in Example 36 are dissolved in 100 ml. benzene; after adding 6.1 ml. triethylamine, 18.9 g. bis-2,4-dinitrophenyl carbonate are introduced while stirring and the mass is then allowed to stand for 4 hours. Thereafter, 400 ml. benzene and 200 ml. of a basic ion exchanger are added, and 6.8 g. 3-ethylene imino-propylamine are added drop by drop with continuous stirring for 30 minutes. After passing a mixed-bed column and concentration by evaporation one obtains 54.6 g. of a light yellow viscous oil which solidifies to a wax-like mass at room temperature.

3 g. of this substance are mixed with 0.09 g. p-toluene sulfonic methylester at 45° C. Cross-linking with formation of a transparent rubber-elastic body starts after about 3 minutes, and is completed after 2 hours heating to 60° C.

Example 40

To a solution of 8.8 g. 3-ethylene imino-propylamine and 8.9 g. triethylamine in a mixture of 500 ml. benzene and 100 ml. ethyleneglycol dimethylether, we add at −5° to 0° C. 364 g. polyetherdiol-bis-chloroformate of a mean molecular weight 9,100 (prepared from a copolymer of tetrahydrofuran and ethylene oxide by known reaction with phosgene) during 15 minutes and continue stirring for 2 hours at 0° C. After addition of 3000 ml. benzene, passage through a mixed-bed column and concentration by heating, in the last stage in vacuo, a colorless oil is obtained having a base equivalent of 8250.

5 g. of this ethylene imine compound are mixed with 0.15 g. m-chloro-benzene sulfonic acid methyl ester and heated to 60° C. for 30 minutes resulting in a rubber-elastic mass.

Example 41

To a solution of 37.6 g. polyetherdiol-bis-chloroformate with a molecular weight of 9400, in 120 ml. ether, 2.02 g. triethylamine and 1.33 g. p-nitrophenol are added dropwise, dissolved in 25 ml. of ethylene glycol dimethylether. The precipitation formed is removed by centrifugation and after addition of 50 ml. basic ion exchanger, there are added to this solution 1.54 g. 5-ethylene imino pentylamine dissolved in 10 ml. ether, while stirring. Further processing is done as in Example 40, and obtained are 32.4 g. of a slightly yellow oil of a base equivalent of 5720.

A mixture of the so obtained substance with 3% m-chloro-benzene sulfonic acid methyl ester yields after about 10 minutes heating to 60° C. a rubber-elastic mass.

Example 42

4 g. of the ethylene imine compound described in Example 13 are mixed with 0.2 g. tetrapropylene-benzene sulfonic acid. After a short while, gelling sets in, which leads in about 5 minutes to a rubber-elastic body.

What is claimed is:

1. The product of a process for preparing a rubber-like elastomer comprising reacting a polyether of the formula

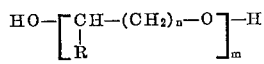

in which $n$ is at least one integer of from 1 to 3, $m$ is the mean degree of polymerization and is from about 25 to about 500, and R is H or alkyl with acrylic or crotonic acid or anhydride whereby the reaction product has terminal ethylenically unsaturated functional groups, reacting with said reaction product ethylene imine whereby said ethylene imine adds to said ethylenically unsaturated functional groups to form an ethylene imine compound having an average of more than one ethylene imine functional group of the formula

a mean minimum molecular weight of 1,000 and a minimum ethylene imine equivalent of 500, and reacting said ethylene imine compound with a cross linking agent capable of converting ethylene imine groups into ethylene immonium groups whereby said elastomer is formed.

2. The product of a process for preparing a rubber-like elastomer comprising reacting a polyether of the formula

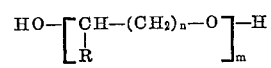

in which $n$ is at least one integer of from 1 to 3, $m$ is the mean degree of polymerization and is from about 25 to about 500, and R is H or alkyl with an α-halogen carboxylic acid whereby the reaction product has terminal α-halogen acyl groups, reacting with said reaction product ethylene imine whereby said ethylene imine reacts with said α-halogen acyl groups to form an ethylene imine compound having an average of more than one ethylene imine functional group of the formula

a mean minimum molecular weight of 1,000 and a minimum ethylene imine equivalent of 500, and reacting said ethylene imine compound with a cross linking agent capable of converting ethylene imine groups into ethylene immonium groups whereby said elastomer is formed.

3. The product of a process for preparing a rubber-like elastomer comprising reacting a polyether of the formula

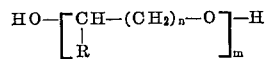

in which $n$ is at least one integer of from 1 to 3, $m$ is the mean degree of polymerization and is from about 25 to about 500, and R is H or alkyl with an α-halogen carboxylic acid whereby the reaction product has terminal α-halogen acyl groups, reacting said reaction product with ammonia or potassium phthalimide to substitute amino groups for said α-halogens, reacting with said amino-substituted reaction product an ethylene imino carboxylic acid ether whereby the ester groups of said ethylene imino carboxylic acid ester condense with the amino groups of said amino-substituted reaction product to form an ethylene imine compound having an average of more than one ethylene imine functional group of the formula

a means minimum molecular weight of 1,000 and a minimum ethylene imine equivalent of 500, and reacting said ethylene imine compound with a cross linking agent capable of converting ethylene imine groups into ethylene immonium groups whereby said elastomer is formed.

4. The product of a process for preparing a rubber-like elastomer comprising reacting a polyether of the formula

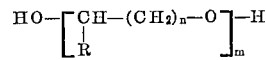

in which $n$ is an integer of from 1 to 3, $m$ is the mean degree of polymerization and is from about 25 to about 500, R is H, alkyl or terminal halo-substituted alkyl, at least some of R being terminal halo-substituted alkyl, with ammonia or potassium phthalimide to substitute amino groups for said halogens, reacting with said amino-substituted reaction product an ethylene imino carboxylic acid ester whereby the ester groups of said ethylene imino carboxylic acid ester condense with the amino groups of said amino-substituted reaction product to form an ethylene imine compound having an average of more than one ethylene imine functional group of the formula

a mean minimum molecular weight of 1,000 and a minimum ethylene imine equivalent of 500, and reacting said ethylene imine compound with a cross linking agent capable of converting ethylene imine groups into ethylene immonium groups whereby said elastomer is formed.

5. The product of a process for preparing a rubber-like elastomer comprising reacting a polyether of the formula

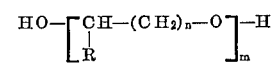

in which $n$ is an integer of from 1 to 3, $m$ is the mean degree of polymerization and is from about 25 to about 500, R is H, alkyl or terminal halo-substituted alkyl, at least some of R being terminal halo-substituted alkyl, with ethylene imine whereby said ethylene imine condenses with the halogens of said polyether to form an ethylene imine compound having an average of more than one ethylene imine functional group of the formula

a mean minimum molecular weight of 1,000 and a minimum ethylene imine equivalent of 500, and reacting said ethylene imine compound with a cross linking agent capable of converting ethylene imine groups into ethylene immonium groups whereby said elastomer is formed.

6. The product of a process for preparing a rubber-like elastomer comprising reacting a polyether of the formula

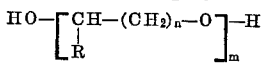

in which $n$ is an integer of from 1 to 3, $m$ is the mean degree of polymerization and is from about 25 to about 500, R is H, alkyl or terminal hydroxyl-substituted alkyl, at least some of R being terminal hydroxyl-substituted alkyl, with acrylic or crotonic acid or anhydride whereby the reaction product has terminal ethylenically unsaturated functional groups, reacting with said reaction product ethylene imine whereby said ethylene imine adds to said ethylenically unsaturated functional groups to form an ethylene imine compound having an average of more than one ethylene imine functional group of the formula

a mean minimum molecular weight of 1,000 and a minimum ethylene imine equivalent of 500, and reacting said ethylene imine compound with a cross linking agent capable of converting ethylene imine groups into ethylene ammonium groups whereby said elastomer is formed.

7. The product of a process for preparing a rubber-like elastomer comprising reacting a polyether of the formula

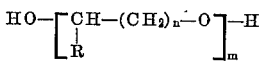

in which $n$ is at least one integer of from 1 to 3, $m$ is the mean degree of polymerization and is from about 25 to about 500, and R is H or alkyl with phosgene whereby the reaction product has terminal chloroformate groups and reacting said reaction product with an ethylene imino amine to form an ethylene imine compound having an average of more than one ethylene imine functional groups of the formula

a mean minimum molecular weight of 1,000 and a minimum ethylene imine equivalent of 500, and reacting said ethylene imine compound with a cross linking agent capable of converting ethylene imine groups into ethylene ammonium groups whereby said elastomer is formed.

8. The product of a process for preparing a rubber-like elastomer comprising reacting a polyether of the formula

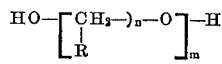

in which $n$ is an integer of from 1 to 3, $m$ is the mean degree of polymerization and is from about 25 to about 500, R is H, alkyl or terminal hydroxyl-substituted alkyl, at least some of R being terminal hydroxyl-substituted alkyl, with phosgene whereby the terminal hydroxyl groups are converted to chloroformate groups and reacting said reaction product with an ethylene imino amine to form an ethylene imine compound having an average of more than one ethylene imine functional group of the formula

a mean minimum molecular weight of 1,000 and a minimum ethylene imine equivalent of 500, and reacting said ethylene imine compound with a cross linking agent capable of converting ethylene imine groups into ethylene ammonium groups whereby said elastomer is formed.

9. The product of a process for preparing a rubber-like elastomer comprising reacting a polyether of the formula

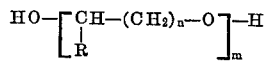

in which $n$ is at least one integer of from 1 to 3, $m$ is the mean degree of polymerization and is from about 25 to about 500, and R is H or alkyl or methyl ester, at least some of R being methyl ester, with an ethylene imino amine to form an ethylene imine compound having an average of more than one ethylene imine functional group of the formula

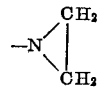

a mean minimum molecular weight of 1,000 and a minimum ethylene imine equivalent of 500, and reacting said ethylene imine compound with a cross linking agent capable of converting ethylene imine groups into ethylene ammonium groups whereby said elastomer is formed.

References Cited

UNITED STATES PATENTS

| | | | |
|---|---|---|---|
| 3,267,077 | 8/1966 | Windemuth et al. | 260—75 |
| 2,626,931 | 1/1953 | Bestian | 260—2 |
| 3,087,912 | 4/1963 | Wagner | 260—75 |
| 3,013,914 | 12/1961 | Willard | 260—75 |

WILLIAM H. SHORT, *Primary Examiner.*

M. GOLDSTEIN, *Assistant Examiner.*

U.S. Cl. X.R.

161—190, 195, 197; 260—2, 2.5, 75, 78, 78.4, 79; 261—1, 17

UNITED STATES PATENT OFFICE
CERTIFICATE OF CORRECTION

Patent No. 3,453,242                      July 1, 1969

Werner Schmitt et al.

It is certified that error appears in the above identified patent and that said Letters Patent are hereby corrected as shown below:

Column 25, lines 53 to 55, the formula should appear as shown below:

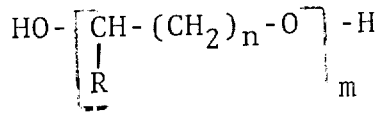

Signed and sealed this 8th day of September 1970.

(SEAL)
Attest:

Edward M. Fletcher, Jr.

Attesting Officer

WILLIAM E. SCHUYLER, JR.

Commissioner of Patents